United States Patent
Ide et al.

(10) Patent No.: US 11,630,309 B2
(45) Date of Patent: Apr. 18, 2023

(54) IMAGE LIGHT GENERATION MODULE AND IMAGE DISPLAY DEVICE

(71) Applicant: SEIKO EPSON CORPORATION, Tokyo (JP)

(72) Inventors: Mitsutaka Ide, Shiojiri (JP); Masatoshi Yonekubo, Suwagun-Haramura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 212 days.

(21) Appl. No.: 17/162,186

(22) Filed: Jan. 29, 2021

(65) Prior Publication Data

US 2021/0239989 A1 Aug. 5, 2021

(30) Foreign Application Priority Data

Jan. 31, 2020 (JP) .............................. JP2020-015381

(51) Int. Cl.
*G02B 27/01* (2006.01)
(52) U.S. Cl.
CPC .. *G02B 27/0172* (2013.01); *G02B 2027/0114* (2013.01); *G02B 2027/0178* (2013.01)
(58) Field of Classification Search
CPC ................................................ G02B 27/0172
See application file for complete search history.

(56) References Cited

U.S. PATENT DOCUMENTS

| | | | |
|---|---|---|---|
| 6,137,635 A | 10/2000 | Nakazawa | |
| 6,439,724 B1* | 8/2002 | Jeon | H04N 9/3105 353/101 |
| 6,457,829 B1 | 10/2002 | Nakazawa et al. | |
| 2019/0305255 A1 | 10/2019 | Koshihara | |
| 2020/0004026 A1 | 1/2020 | Yonekubo et al. | |
| 2020/0026083 A1* | 1/2020 | Yamamoto | G02B 27/102 |
| 2021/0226173 A1 | 7/2021 | Koshihara | |

FOREIGN PATENT DOCUMENTS

| | | |
|---|---|---|
| CN | 110308562 A | 10/2019 |
| JP | H08-201756 A | 8/1996 |
| JP | 2000-039584 A | 2/2000 |
| JP | 2001-066695 A | 3/2001 |
| JP | 2002-006298 A | 1/2002 |
| JP | 2020-003710 A | 1/2020 |

* cited by examiner

*Primary Examiner* — Edmond C Lau
(74) *Attorney, Agent, or Firm* — Oliff PLC

(57) ABSTRACT

An image light generation module includes a first display element configured to emit first image light, a second display element configured to emit second image light, a third display element configured to emit third image light, a combining prism configured to emit combined image light combined from the first image light, the second image light, and the third image light, and a first gap defining member that defines a first gap between the first display element and the combining prism, a second gap defining member that defines a second gap between the second display element and the combining prism, and a third gap defining member that defines a third gap between the third display element and the combining prism, in which at least one of the first gap, the second gap, and the third gap is different in size from another of the gaps.

8 Claims, 10 Drawing Sheets

IMAGE LIGHT GENERATION MODULE AND IMAGE DISPLAY DEVICE

The present application is based on, and claims priority from JP Application Serial Number 2020-015381, filed Jan. 31, 2020, the disclosure of which is hereby incorporated by reference herein in its entirety.

BACKGROUND

1. Technical Field

The present disclosure relates to an image light generation module and an image display device.

2. Related Art

There is disclosed, in JP 2001-066695 A, a projector including three pieces of display elements configured to emit image light of RGB colors and a combining prism configured to combine light emitted from the display elements. The projector is provided with correction lenses for correcting magnification chromatic aberration, between the display elements and the combining prism.

However, the projector described above is required to provide disposition spaces for disposing the corrective lenses between the combining prism and each of the display elements, which raises an issue in that an apparatus configuration is increased in size by as much as the disposition spaces of the correction lenses, or a weight increase is caused by the correction lenses.

SUMMARY

A first aspect of the present disclosure to resolve the above-described issue provides an image light generation module including a first display element configured to emit first image light, a second display element configured to emit second image light of color light different from the color light of the first image light, a third display element configured to emit third image light of color light different from the color light of the first image light and the second image light, a combining prism configured to emit combined image light combined from the first image light, the second image light, and the third image light, a first gap defining member configured to define a first gap between the first display element and the combining prism, a second gap defining member configured to define a second gap between the second display element and the combining prism, and a third gap defining member configured to define a third gap between the third display element and the combining prism, in which at least one of the first gap, the second gap, or the third gap is different in size from another of the gaps.

A second aspect of the present disclosure provides an image light generation module including a first display element including a first effective display region configured to emit first image light, a second display element including a second effective display region configured to emit second image light of color light different from the color light of the first image light, a third display element including a third effective display region configured to emit a third image light of color light different from the color light of the first image light and the second image light, and a combining prism configured to hold the first display element, the second display element, and the third display element, and to emit combined image light combined from the first image light, the second image light, and the third image light, in which at least one of the first effective display region, the second effective display region, or the third effective display region is different in size from another of the effective display regions.

A third aspect of the present disclosure provides an image display device including the image light generation module of the first aspect or the second aspect, and a light-guiding optical system configured to guide the combined image light emitted from the image light generation module.

DESCRIPTION OF EXEMPLARY EMBODIMENTS

First Embodiment

Hereinafter, one embodiment of the present disclosure will be described with reference to the drawings.

Figure 1:
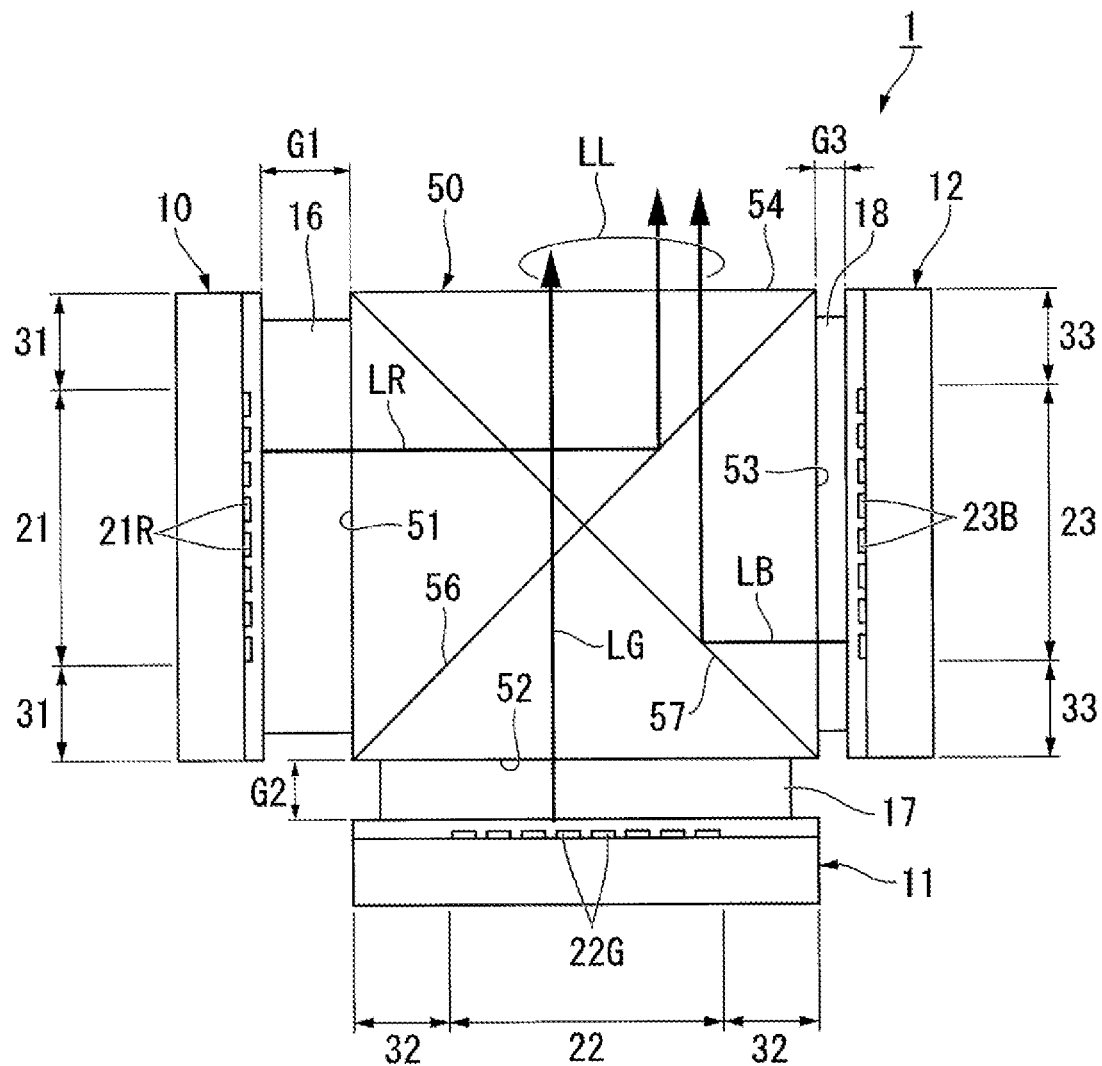
FIG. 1 is a diagram schematically illustrating a configuration of an image light generation module of a first embodiment.

FIG. 1 is a diagram schematically illustrating a configuration of an image light generation module of the first embodiment of the present disclosure.

Note that in the drawings below, the dimensions of some constituents may be scaled differently for ease of visually recognizing the constituents.

As illustrated in FIG. 1, an image light generation module 1 includes a first display element 10, a second display element 11, a third display element 12, and a combining prism 50.

The first display element 10 includes a first effective display region 21 and a first non-display region 31. The first effective display region 21 includes a plurality of pixels 21R configured to generate red color light, and is a region configured to generate and emit red image light (first image light) LR in a red wavelength range. The first non-display region 31 is a region that does not include the pixels 21R and does not emit the red image light LR.

The second display element 11 includes a second effective display region 22 and a second non-display region 32. The second effective display region 22 includes a plurality of pixels 22G configured to emit green color light, and is a region configured to generate and emit green image light (second image light) LG in a green wavelength range. The second non-display region 32 is a region that does not include the pixels 22G and does not emit the green image light LG.

The third display element 12 includes a third effective display region 23 and a third non-display region 33. The third effective display region 23 includes a plurality of pixels 23B configured to emit blue color light, and is a region configured to generate and emit blue image light (third image light) LB in a blue wavelength range. The third non-display region 33 is a region that does not include the pixels 23B and does not emit the blue image light LB.

Hereinafter, the first display element 10, the second display element 11, and the third display element 12 may be collectively referred to as display elements 10, 11, and 12.

In the first embodiment, each of the display elements 10, 20, and 30 is configured by a top emission type organic EL device, for example. Note that in the first embodiment, a basic configuration of panels of the display elements 10, 11, and 12 are the same, except that wavelength bands of light emitted from the display elements 10, 11, and 12 differ from one another. Thus, the first effective display region 21, the second effective display region 22, and the third effective display region 23 have an identical pixel structure. Here, the term "identical pixel configuration" means that the sizes, numbers of pixels, and pixel pitches are equal to one another in the effective display regions.

The first display element 10 is configured to emit the red image light LR in the red wavelength range from the first effective display region 21. The red image light LR contains the red color light emitted from the plurality of pixels 21R in the first effective display region 21. The red image light LR emitted from the first effective display region 21 of the first display element 10 is incident on the combining prism 50. Note that a peak wavelength in the red wavelength region is greater than or equal to 630 nm and less than or equal to 680 nm, for example.

The second display element 11 is configured to emit the green image light LG in the green wavelength range. The green image light LG contains the green color light emitted from the plurality of pixels 22G in the second effective display region 22. The green image light LG emitted from the second effective display region 22 of the second display element 11 is incident on the combining prism 50. Note that a peak wavelength in the green wavelength region is greater than equal to 495 nm and less than or equal to 570 nm, for example.

The third display element 12 is configured to emit the blue image light LB in the blue wavelength range. The blue image light LB contains the blue color light emitted from the plurality of pixels 23B in the third effective display region 23. The blue image light LB emitted from the third effective display region 23 of the third display element 12 is incident on the combining prism 50. Note that a peak wavelength in the blue wavelength region is greater than or equal to 450 nm and less than or equal to 490 nm, for example.

The combining prism 50 is constituted from a light transmissive member having a quadrangular columnar shape. The combining prism 50 includes a first incidence face 51, a third incidence face 53 that faces opposite to the first incidence face 51, a second incidence face 52 that is in perpendicular contact with the first incidence face 51 and the third incidence face 53, and an emission face 54 that faces opposite to the second incidence face 52.

The combining prism 50 includes a first dichroic mirror 56 and a second dichroic mirror 57. The first dichroic mirror 56 and the second dichroic mirror 57 cross each other at an angle of 90 degrees. The first dichroic mirror 56 has characteristics that reflect the red image light LR and transmit the green image light LG and the blue image light LB. The second dichroic mirror 57 has characteristics that reflect the blue image light LB and transmit the red image light LR and the green image light LG.

The first display element 10 is disposed facing the first incidence face 51. The second display element 11 is disposed facing the second incidence face 52. The third display element 12 is disposed facing the third incidence face 53.

In the first embodiment, the first display element 10 is fixed to the first incidence face 51 of the combining prism 50 by a first adhesive member (first gap defining member) 16. The first adhesive member 16 is configured to hold the first display element 10 at the combining prism 50 so as to define a first gap G1 between the first display element 10 and the first incidence face 51. The first adhesive member 16 is constituted of a light-transmissive adhesive material (light transmissive member) having light-transmissivity. The red image light LR emitted from the first display element 10 passes through the first adhesive member 16 to be incident on the first incidence face 51. In the first embodiment, the first adhesive member 16 has a function as a protective layer that protects a light emission face of the first display element 10.

The second display element 11 is fixed to the second incidence face 52 of the combining prism 50 by a second adhesive member (second gap defining member) 17. The second adhesive member 17 is configured to hold the second display element 11 at the combining prism 50 so as to define a second gap G2 between the second display element 11 and the second incidence face 52. The second adhesive member 17 is constituted of a light-transmissive adhesive material (light transmissive member) having light-transmissivity. The green image light LG emitted from the second display element 11 passes through the second adhesive member 17 to be incident on the second incidence face 52. In the first embodiment, the second adhesive member 17 has a function as a protective layer that protects a light emission face of the second display element 11.

The third display element 12 is fixed to the third incidence face 53 of the combining prism 50 by a third adhesive member (third gap defining member) 18. The third adhesive member 18 is configured to hold the third display element 12 at the combining prism 50 so as to define a third gap G3 between the third display element 12 and the third incidence face 53. The third adhesive member 18 is constituted of a light-transmissive adhesive material (light transmissive member) having light-transmissivity. The blue image light LB emitted from the third display element 12 passes through the third adhesive member 18 to be incident on the second incidence face 52. In the first embodiment, the third adhesive member 18 has a function as a protective layer that protects a light emission face of the third display element 12.

The image light generation module 1 of the first embodiment is configured to emit combined image light LL combined from the red image light LR, the green image light LG, and the blue image light LB through the emission face 54 of the combining prism 50.

The image light generation module 1 of the first embodiment is used as an image display unit of a head-mounted display apparatus that will be described later, for example. The image light generation module 1, when configuring the image display unit of the head-mounted display apparatus, is used in combination with optical components such as a lens or a light-guiding member, for example. An optical glass material, which is typically a constituent material of the optical components, includes a wavelength dispersibility. This allows the refractive indices to vary for each of the wavelengths, chromatic aberrations are generated in the light passing through the optical component. The chromatic aberrations include on-axis chromatic aberration in which imaging positions are shifted in a front-rear direction of an optical axis due to differences in the refractive indices for each of the wavelengths, and magnification chromatic aberration in which the imaging positions are shifted to a lateral direction that intersects the optical axis due to the differences in the refractive indices for each of the wavelengths.

In particular, in the head-mounted display apparatus including a shape along the face of an observer, an eccentric optical system is used in which non-rotationally symmetric lenses are combined, rather than a coaxial optical system in which rotationally symmetric lenses are combined as an optical system. A use of glass lenses for such non-rotationally symmetric lenses increases costs, and thus, the chromatic aberrations that are generated in the optical system used in the head-mounted display apparatus have been typically removed by combining a plurality of plastic lenses.

On the other hand, the head-mounted display apparatus is desirably compact and lightweight like optical glasses, thus it is desirable to reduce the number of lenses as much as possible even when removing the chromatic aberrations. Accordingly, when removing the chromatic aberrations, there is a desire to provide a new structure that can reduce the number of lenses.

The image light generation module 1 of the first embodiment is an image light generation module that has achieved size reduction and weight reduction of the head-mounted display apparatus while reducing the on-axis chromatic aberration of the optical components. Hereinafter, a configuration of the image light generation module 1 for reducing the on-axis chromatic aberration of the optical components will be described.

Figure 2:
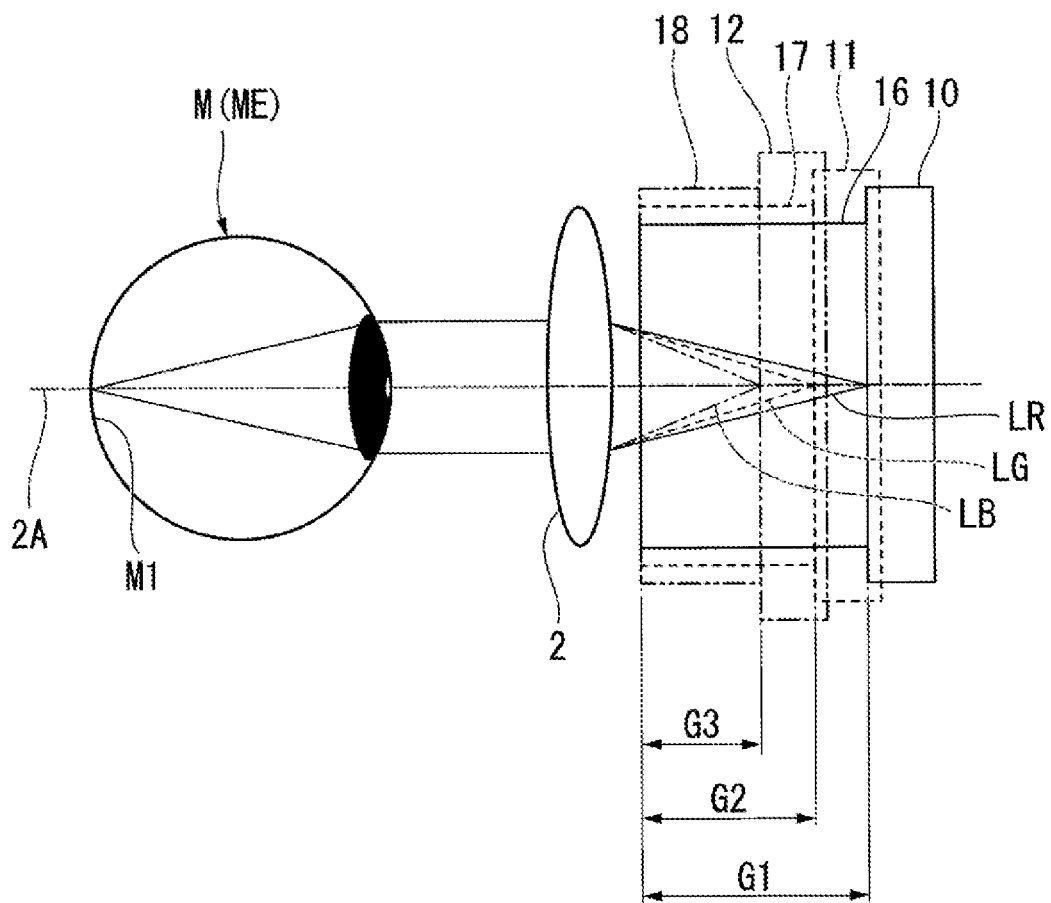
FIG. 2 is a diagram schematically illustrating a layout of members in an image light generation module.

FIG. 2 is a diagram schematically illustrating a layout of members in the image light generation module 1. In FIG. 2, an illustration of the combining prism 50 is omitted and the display elements 10, 11, and 12 are aligned on a straight line, for ease of explanation. Note that FIG. 2 illustrates a case where the optical component is constituted by one piece of a single lens. Also, the members are varied in size from one another in order to make a positional relationship among the members easily viewable.

The on-axis chromatic aberration due to the single lens allows light rays on the shorter wavelength side to be converged closer, and causes light rays on the longer wavelength side to be converged farther away. Accordingly, an optical path length of light in the blue wavelength band on the shorter wavelength side is shortened and an optical path length of light in the red wavelength band on the longer wavelength side is elongated when using an optical component 2 constituted by the one piece of a single lens, which enables to inhibit the on-axis chromatic aberration from being generated on a retina M1. That is, it suffices that an emission position of the light in the blue wavelength band relative to the optical component 2 be disposed closer, and an emission position of the light in the red wavelength band relative to the optical component 2 be disposed farther away.

In the image light generation module 1 of the first embodiment, emission positions of the red image light LR, the green image light LG, and the blue image light LB are varied in a direction along an optical axis 2A of the optical component 2, as illustrated in FIG. 2. In the image light generation module 1 of the first embodiment, the first gap G1, the second gap G2, and the third gap G3 are varied in size to adjust optical path lengths of the red image light LR, the green image light LG, and the blue image light LB.

Specifically, the first gap G1, the second gap G2, and third gap G3 are reduced in size in this order. That is, the first gap G1 is the largest in size and the third gap G3 is the smallest in size, where the second gap G2 has a size between the first gap G1 and the third gap G3. Note that the first gap G1, the second gap G2, and the third gap G3 are appropriately set in size in accordance with the on-axis chromatic aberration of the optical component 2 to be combined.

In the image light generation module 1 of the first embodiment, the first display element 10 is disposed so as to emit the red image light LR from a position, on the retina M1, at which the on-axis chromatic aberration is not generated. Specifically, in the image light generation module 1, the first gap G1 is relatively increased in size to dispose the first display element 10 at a position farthest from the optical component 2, to elongate the optical path length of the red image light LR.

Also, in the image light generation module 1 of the first embodiment, the third display element 12 is also disposed so as to emit the blue image light LB from a position, on the retina M1, at which the on-axis chromatic aberration is not generated. Specifically, in the image light generation module 1, the third gap G3 is relatively reduced in size to dispose the third display element 12 at a position closest to the optical component 2, due to the on-axis chromatic aberration, to shorten the optical path length of the blue image light LB.

Also, in the image light generation module 1 of the first embodiment, the second display element 11 is also disposed so as to emit the green image light LG from a position, on the retina M1, at which the on-axis chromatic aberration is not generated. Specifically, in the image light generation module 1, the second gap G2 is set to a size between the first gap G1 and the third gap G3 to dispose the second display element 11 between the first display element 10 and the third display element 12, thus adjusting the optical path length of the green image light LG to be a length between the red image light LR and the blue image light LB.

Here, an image light generation module will be taken into account as a comparative example, in which the first gap G1, the second gap G2, and the third gap G3 are equalized in size. In the image light generation module of the comparative example, a state is achieved in which the emission positions of the red image light LR, the green image light LG, and the blue image light LB relative to the optical component 2 coincide with one another, thus, the red image light LR, the green image light LG, and the blue image light LB are converged at different positions due to the on-axis chromatic aberration of the optical component 2, and do not form an image on the retina M1.

Thus, in the image light generation module of the comparative example, the red image light LR, the green image light LG, and the blue image light LB do not form an image on the retina M1 due to the on-axis chromatic aberration of the optical component 2, resulting in a blurring of the image that is visually recognized by an observer M.

In contrast, according to the image light generation module 1 of the first embodiment, the first gap G1, the second gap G2, and third gap G3 gaps are varied in size to emit the red image light LR, the green image light LG, and the blue image light LB from positions, on the retina M1, at which the on-axis chromatic aberration is not generated.

This allows the on-axis chromatic aberration of the optical component 2 which is generated on the retina M1 to be canceled, thus, the red image light LR, the green image light LG, and the blue image light LB that are emitted from the display elements 10, 11, and 12 pass through the optical component 2 to form an image on the retina M1 of an eye ME of the observer M.

Thus, according to the image light generation module 1 of the first embodiment, the red image light LR, the green image light LG, and the blue image light LB form an image on the retina M1, thus enabling the observer M to visually recognize a high-quality image in which a blurring is suppressed.

In addition, according to the image light generation module 1 of the first embodiment, the on-axis chromatic aberration of the optical component 2 can be removed, which makes lenses for removing the on-axis chromatic aberration of the optical component 2 unnecessary when using the image light generation module 1 as the image display unit of the head-mounted display apparatus that will be described later. Thus, according to the image light generation module 1 of the first embodiment, the number of lenses can be reduced by as much as the lenses for removing the on-axis chromatic aberration of the optical component 2, which makes it possible to achieve size reduction and weight reduction of the head-mounted display apparatus.

Second Embodiment

Next, an image light generation module of the second embodiment of the present disclosure will be described with reference to the drawings. The image light generation module 1 of the first embodiment relates to a module focusing attention on reducing the on-axis chromatic aberration ascribed to the optical components, and the image light generation module of the second embodiment is an image light generation module that achieves size reduction and weight reduction of the head-mounted display apparatus while reducing the magnification chromatic aberration of the optical component.

Figure 3:
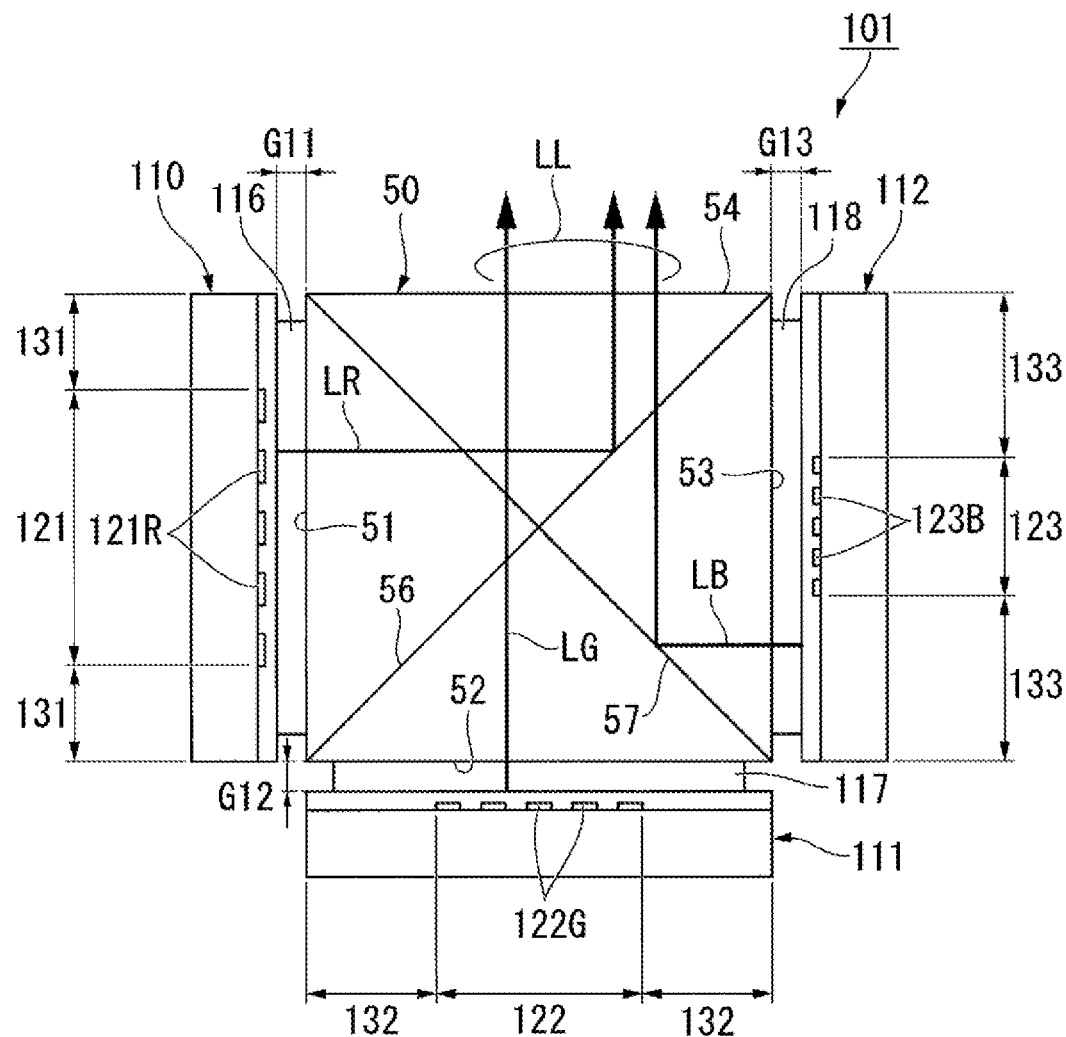
FIG. 3 is a diagram schematically illustrating a configuration of an image light generation module of a second embodiment.

FIG. 3 is a diagram schematically illustrating a configuration of an image light generation module of the second embodiment. Note that constituents and members that are common to the first embodiment will be denoted by identical reference signs, and detailed descriptions for these will be omitted. As illustrated in FIG. 3, an image light generation module 101 of the second embodiment includes a first display element 110, a second display element 111, a third display element 112, and the combining prism 50. The first display element 110 includes a first effective display region 121 and a first non-display region 131 in which a plurality of pixels 121R are provided in a matrix pattern. The first effective display region 121 of the first display element 110 includes the plurality of pixels 121R.

The second display element 111 includes a second effective display region 122 and a second non-display region 132 in which a plurality of pixels 122G are provided in a matrix pattern. The second effective display region 122 of the second display element 111 includes the plurality of pixels 122G.

The third display element 112 includes a third effective display region 123 and a third non-display region 133 in which a plurality of pixels 123B are provided in a matrix pattern. The third effective display region 123 of the third display element 112 includes the plurality of pixels 123B.

Hereinafter, the first display element 110, the second display element 111, and the third display element 112 may be collectively referred to as display elements 110, 111, and 112.

In the image light generation module 101 of the second embodiment, the first display element 110 is fixed to the first incidence face 51 of the combining prism 50 by a first adhesive member 116. The first adhesive member 116 is configured to hold the first display element 10 at the combining prism 50 so as to define a first gap G11 between the first display element 10 and the first incidence face 51. The red image light LR emitted from the first display element 110 passes through the first adhesive member 116 to be incident on the first incidence face 51.

The second display element 11 is fixed to the second incidence face 52 of the combining prism 50 by a second adhesive member 117. The second adhesive member 117 is configured to hold the second display element 111 at the combining prism 50 so as to define a second gap G12 between the second display element 111 and the second incidence face 52. The green image light LG emitted from the second display element 111 passes through the second adhesive member 117 to be incident on the second incidence face 52.

The third display element 112 is fixed to the third incidence face 53 of the combining prism 50 by an adhesive member 118. The third adhesive member 118 is configured to hold the third display element 12 at the combining prism 50 so as to define a third gap G13 between the third display element 112 and the third incidence face 53. The blue image light LB emitted from the third display element 112 passes through the third adhesive member 118 to be incident on the second incidence face 52.

In the image light generation module 101 of the second embodiment, the first gap G11, the second gap G12, and the third gap G13 are equal in size.

Figure 4:
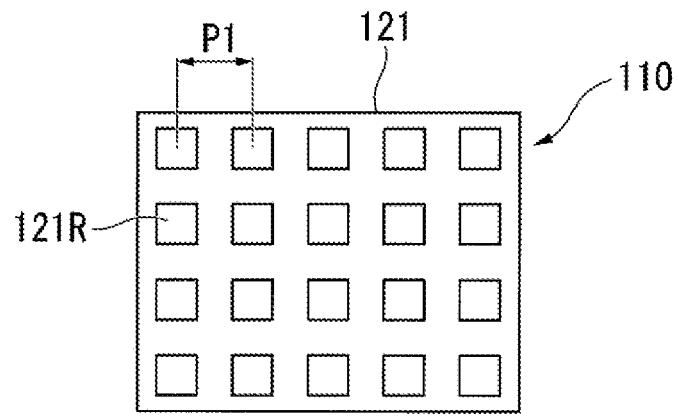
FIG. 4 is a diagram illustrating a configuration of an effective display region in display elements.
Figure 4:
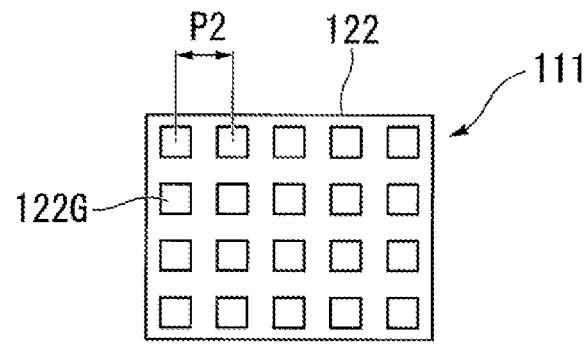
Figure 4:
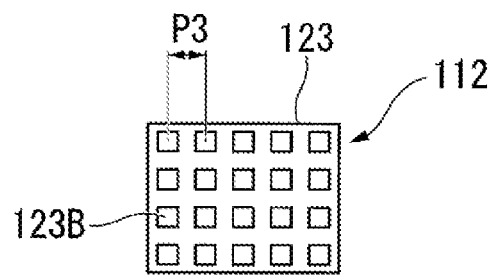

FIG. 4 is a diagram illustrating a configuration of an effective display region in the display elements.

As illustrated in FIG. 4, in the image light generation module 101 of the second embodiment, the first effective display region 121, the second effective display region 122, and the third effective display region 123 vary in size from one another.

The first effective display region 121, the second effective display region 122, and the third effective display region 123 are reduced in size in this order. That is, the first effective display region 121 has the widest area, the third effective display region 123 has the narrowest area, and the second effective display region 122 has an area between the first effective display region 121 and the third effective display region 123. The first effective display region 121, the second effective display region 122, and the third effective display region 123 are rectangular planar shaped, and the first effective display region 121, the second effective display region 122, and the third effective display region 123 have, in terms of the sizes, a similarity relationship with one another.

Note that in the second embodiment, it is sufficient for the effective display regions in the display elements 111, 112, and 113 to vary in size, and the non-display regions in the display elements 111, 112, and 113 may be varied in size to make the external sizes conform to one another.

In the second embodiment, the first effective display region 121, the second effective display region 122, and the third effective display region 123 are equal in resolution to one another. That is, the first effective display region 121, the second effective display region 122, and the third effective display region 123 are equal in the number of pixels to one another.

In the image light generation module 101 of the second embodiment, the first effective display region 121, the second effective display region 122, and the third effective display region 123 vary in size from one another as described above, and each have an identical number of pixels. The pixels 121R, 122G, and 123B vary in size from one another. The pixels 121R, 122G, and 123B have, in terms of the sizes, a similarity relationship with one another. The pixel pitches of the first effective display region 121, the second effective display region 122, and the third effective display region 123 vary from one another.

In the second embodiment, the pixels 121R, 122G, and 123B are reduced in size in this order. Also, a pixel pitch P1 of the first effective display region 121, a pixel pitch P2 of the second effective display region 122, and a pixel pitch P3 of the third effective display region 123 are reduced in size in this order. The ratio of the sizes of the pixel pitches P1, P2, and P3 in the first effective display region 121, the second effective display region 122, and the third effective display region 123 varies in a ratio according to the sizes of the first effective display region 121, the second effective display region 122, and the third effective display region 123. Note that the ratio of the sizes of the pixel pitches P1, P2, and P3 of the first effective display region 121, the second effective display region 122, and the third effective display region 123 may vary in the same ratio as the ratio of the sizes of the first effective display region 121, the second effective display region 122, and the third effective display region 123.

Hereinafter, an operation of the image light generation module 101 of the second embodiment will be described.

Figure 5:
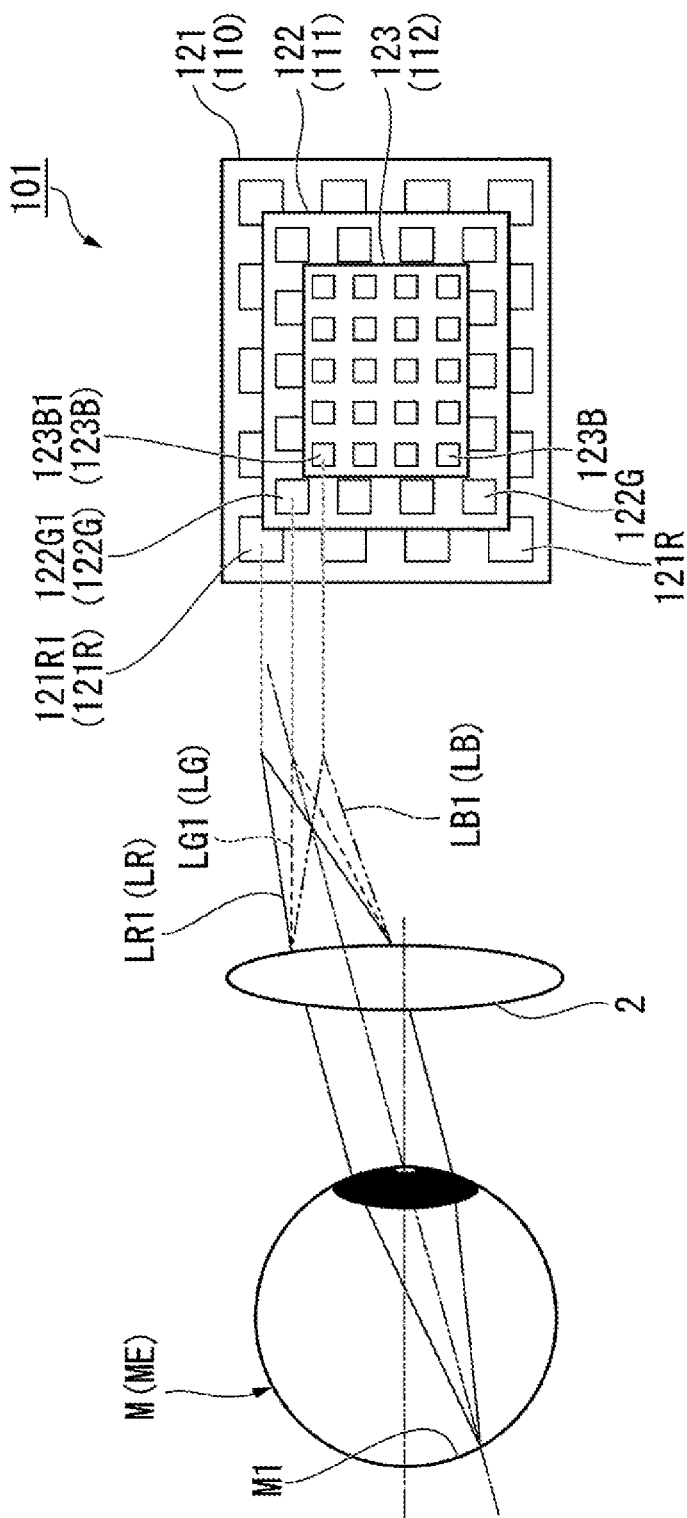
FIG. 5 is an explanatory diagram illustrating an operation of an image light generation module.

FIG. 5 is an explanatory diagram illustrating the operation of the image light generation module 101 of the second embodiment. Note that FIG. 5 illustrates a case where the optical component is constituted by the one piece of a single lens.

The magnification chromatic aberration of the single lens allows the light rays on the shorter wavelength side to be converged closer from the optical axis, and the light rays on the longer wavelength side to be converged at a position farther away from the optical axis. Accordingly, the light in the blue wavelength band on the shorter wavelength side is emitted from a position close to the optical axis 2A of the optical component 2 and the light in the red wavelength band on the longer wavelength side is emitted from a position separated from the optical axis 2A of the optical component 2 when using the optical component 2 constituted by the one piece of a single lens, which enables to inhibit the magnification chromatic aberration from being generated on the retina M1. That is, it suffices that an emission position of the light in the blue wavelength band relative to the optical component 2 be set to a position close to the optical axis 2A, and an emission position of the light in the red wavelength band relative to the optical component 2 be disposed at a position separated from the optical axis 2A.

In the image light generation module 101 of the second embodiment, emission positions of red pixel light LR1, green pixel light LG1, and blue pixel light LB1 are shifted in a direction orthogonal to the optical axis 2A of the optical component 2 when using the optical component 2 constituted by the one piece of a single lens, as illustrated in FIG. 5. The image light generation module 101 of the second embodiment, the first effective display region 121, the second effective display region 122, and the third effective display region 123 are varied in size to adjust the emission positions of the red pixel light LR1, the green pixel light LG1, and the blue pixel light LB1. Note that the first effective display region 121, the second effective display region 122, and the third effective display region 123 are appropriately set in size according to the on-axis chromatic aberration of the optical component 2 to be combined.

Specifically, the image light generation module 101 of the second embodiment, the first effective display region 121, the second effective display region 122, and the third effective display region 123 are reduced in size in this order, and the ratio of the sizes of the pixel pitches P1, P2, and P3 of the first effective display region 121, the second effective display region 122, and the third effective display region 123 are varied by the same ratio as the ratio of the sizes of the first effective display region 121, the second effective display region 122, and the third effective display region 123.

In the descriptions below, light emitted from a certain pixel 121R1 among the plurality of pixels 121R in the first effective display region 121 is assumed to be the red pixel light LR1. Further, light emitted from a single pixel 122G1 among the plurality of pixels 122G in the second effective display region 122 is assumed to be the green pixel light LG1. In addition, light emitted from a single pixel 123B1 among the plurality of pixels 123B in the third effective display region 123 is assumed to be the blue pixel light LB1.

These pixels 121R1, 122G1, and 123B1 are pixels corresponding to one another. Here, the phrase "pixels corresponding to one another" refers to a relationship in which the red pixel light LR1, the green pixel light LG1, and the blue pixel light LB1 are combined to generate one pixel of the combined image light LL. Note that the descriptions below will be given exemplifying the pixels 121R1, 122G1, and 123B1, and similar things are applicable to pixel light emitted from other corresponding pixels.

The image light generation module 101 of the second embodiment includes the first display element 110 in which the first effective display region 121 is set in size so as to emit the red pixel light LR1 from a position, on the retina M1, at which the on-axis chromatic aberration is not generated. Specifically, in the image light generation module 101, the first effective display region 121 of the first display element 110 is relatively increased in size to emit the red pixel light LR1 from a position farthest from the optical axis 2A.

The image light generation module 101 of the second embodiment also includes the third display element 112 in which the third effective display region 123 is set in size so as to emit the blue pixel light LB1 from a position, on the retina M1, at which the on-axis chromatic aberration is not generated. Specifically, in the image light generation module 101, the third effective display region 123 of the third display element 112 is relatively reduced in size to emit the blue pixel light LB1 from a position closest to the optical axis 2A.

The image light generation module 101 of the second embodiment also includes the second display element 111 in which the second effective display region 122 is set in size so as to emit the green pixel light LG1 from a position, on the retina M1, at which the on-axis chromatic aberration is not generated. Specifically, in the image light generation module 101, the second effective display region 122 is set to a size between the first effective display region 121 and the third effective display region 123 to emit the green pixel light LG1 from a position between the blue pixel light LB1 and the red pixel light LR1.

Here, an image light generation module will be taken into account as a comparative example, in which the first effective display region 121, the second effective display region 122, and the third effective display region 123 are equalized in size.

In the image light generation module of the comparative example, a state is achieved in which the emission positions of the red pixel light LR1, the green pixel light LG1, and the blue pixel light LB1 coincide with one another, and thus a state is achieved in which the red pixel light LR1, the green pixel light LG1, and the blue pixel light LB1 are converged at different positions due to the magnification chromatic aberration of the optical component 2 and form images at different positions on the retina M1.

Thus, in the image light generation module of the comparative example, the red pixel light LR1, the green pixel light LG1, and the blue pixel light LB1 form images at different positions on the retina M1 due to the magnification chromatic aberration of the optical component 2, resulting in color bleeding in the image that is visually recognized by the observer M.

In contrast, according to the image light generation module 101 of the second embodiment, the first effective display region 121, the second effective display region 122, and the third effective display region 123 are varied in size to emit the red pixel light LR1, the green pixel light LG1, and the blue pixel light LB1 from positions, on the retina M1, at which the magnification chromatic aberration is not generated. This allows the magnification chromatic aberration of the optical component 2 which is generated on the retina M1 to be canceled, thus, the red pixel light LR1, the green pixel light LG1, and the blue pixel light LB1 that are emitted from the display elements 110, 111, and 112 pass though the optical component 2 to favorably form an image on the retina M1 of the eye ME of the observer M. The red pixel light LR1, the green pixel light LG1, and the blue pixel light LB1 that are emitted from other corresponding pixels 121R, 122G, and 123B as described above form an image on the retina M1 as well.

Thus, according to the image light generation module 101 of the second embodiment, the red pixel light LR1, the green pixel light LG1, and the blue pixel light LB1 form an image on the retina M1, thus allowing the observer M to visually recognize a high-quality image in which the color bleeding is suppressed.

In addition, according to the image light generation module 101 of the second embodiment, the magnification chromatic aberration of the optical component 2 can be removed, which makes lenses for removing the magnification chromatic aberration of the optical component 2 unnecessary when using the image light generation module 101 as the image display unit of the head-mounted display apparatus that will be described later. Thus, according to the image light generation module 101 of the second embodiment, the number of lenses can be reduced by as much as the lenses for removing the magnification chromatic aberration of the optical component 2, which makes it possible to achieve size reduction and weight reduction of the head-mounted display apparatus.

Third Embodiment

Next, an image light generation module according to the third embodiment of the present disclosure will be described with reference to the drawings. The image light generation module of the third embodiment serves as an optical module focusing attention on reducing both of the on-axis and magnification chromatic aberrations that are ascribed to a light-guiding optical system. That is, the image light generation module of the third embodiment includes a configuration combining the first embodiment with the second embodiment.

Figure 6:
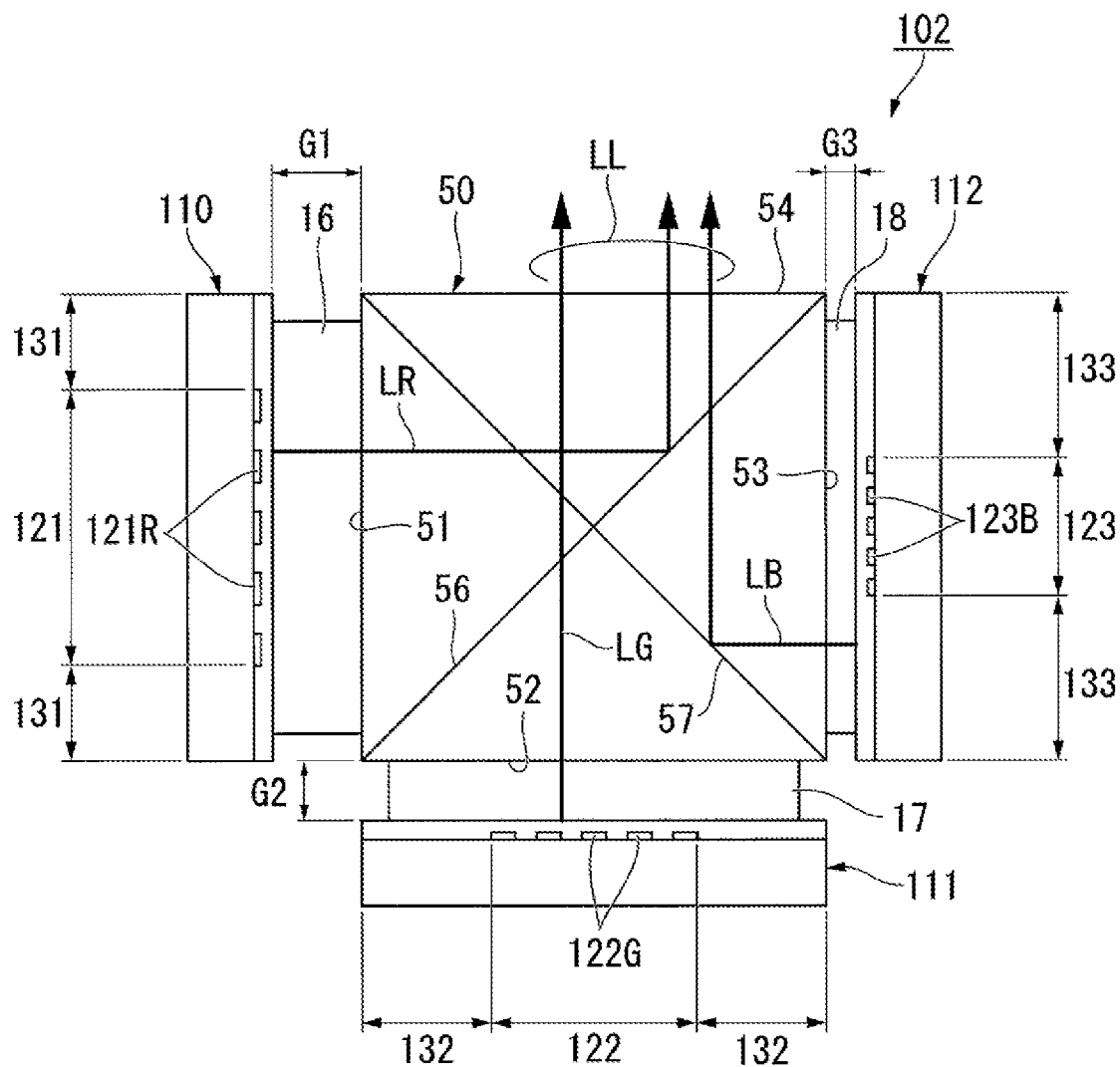
FIG. 6 is a diagram schematically illustrating a configuration of an image light generation module of a third embodiment.

FIG. 6 is a diagram schematically illustrating a configuration of the image light generation module of the third embodiment. Note that constituents and members that are common to the above-described embodiments will be denoted by identical reference signs and detailed descriptions for these will be omitted. As illustrated in FIG. 6, an image light generation module 102 of the third embodiment includes the first display element 110, the second display element 111, the third display element 112, and the combining prism 50. The first display element 110 includes the first effective display region 121 in which the plurality of pixels 121R are provided in a matrix pattern.

In the third embodiment, the first display element 110 is fixed to the first incidence face 51 of the combining prism 50 by the first adhesive member 16. The first adhesive member 16 is configured to hold the first display element 110 at the combining prism 50 so as to define the first gap G1 between the first display element 110 and the first incidence face 51. The red image light LR emitted from the first display element 110 passes through the first adhesive member 16 to be incident on the first incidence face 51.

The second display element 111 is fixed to the second incidence face 52 of the combining prism 50 by the second adhesive member 17. The second adhesive member 17 is configured to hold the second display element 111 at the combining prism 50 so as to define the second gap G2 between the second display element 111 and the second incidence face 52. The green image light LG emitted from the second display element 111 passes through the second adhesive member 17 to be incident on the second incidence face 52.

The third display element 112 is fixed to the third incidence face 53 of the combining prism 50 by the third adhesive member 18. The third adhesive member 18 is configured to hold the third display element 112 at the combining prism 50 so as to define the third gap G3 between the third display element 112 and the third incidence face 53. The blue image light LB emitted from the third display element 112 passes through the third adhesive member 18 to be incident on the second incidence face 52.

In the image light generation module 102 of the third embodiment, the first gap G1, the second gap G2 gap, and the third gap G3 are reduced in size in this order, to thus generate an image with reduced blurring due to the on-axis chromatic aberration of the optical component 2.

Also, in the image light generation module 102 of the third embodiment, the first effective display region 121, the second effective display region 122, and the third effective display region 123 are reduced in size in this order, to thus generate an image with reduced bleeding due to the magnification chromatic aberration of the optical component 2.

Thus, according to the image light generation module 102 of the third embodiment, an image of high image quality with reduced blurring and color bleeding due to the on-axis chromatic aberration and the magnification chromatic aberration of the optical component 2.

In addition, according to the image light generation module 102 of the third embodiment, the number of lenses can be reduced by as much as the lenses for removing the on-axis chromatic aberration and the magnification chromatic aberration of the optical component 2, which makes it possible to achieve further size reduction and weight reduction of the head-mounted display apparatus.

Next, a modified example of the image light generation module will be described.

Figure 7:
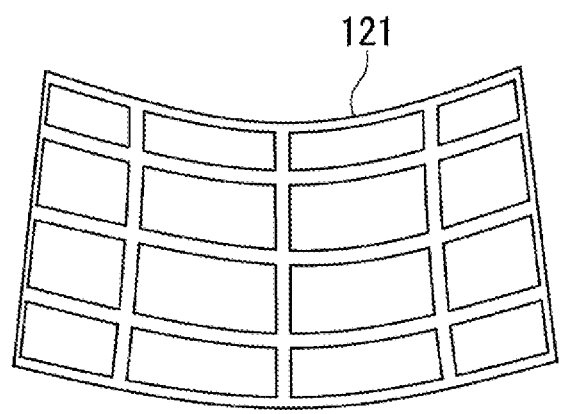
FIG. 7 is a view illustrating a main part configuration of an image light generation module according to a modified example.
Figure 7:
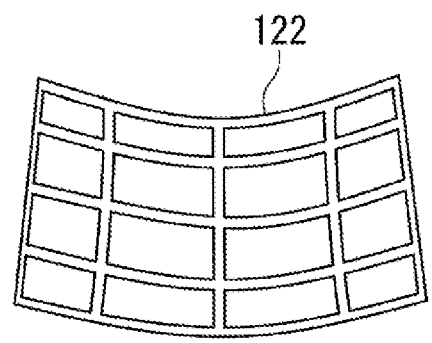
Figure 7:
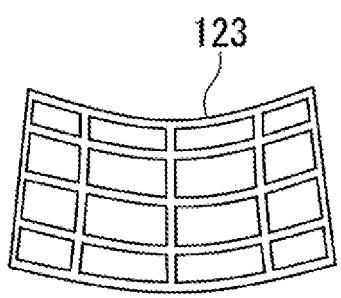

FIG. 7 is a view illustrating a main part configuration of an image light generation module according to the modified example. FIG. 7 is a view illustrating planar shapes of the first effective display region 121, the second effective display region 122, and the third effective display region 123 according to the modified example.

In the third embodiment, an example is given of a case where the first effective display region 121, the second effective display region 122, and the third effective display region 123 are rectangular planar shaped, and the first effective display region 121, the second effective display region 122, and the third effective display region 123 may also have different planar shapes including a sector shape, in addition to quadrangular shapes such as a square shape, a rectangular shape, and the like, as illustrated in FIG. 7. The first effective display region 121, the second effective display region 122, and the third effective display region 123 have the different planar shapes as such, to thus achieve advantageous effects of correcting distortion generated in an image. According to the modified example, the first effective display region 121, the second effective display region 122, and the third effective display region 123 have the different planar shapes, thus suppressing a reduction in the number of pixels which occurs, for example, when correcting distortion by image processing. Thus, according to the modified example, a quality image in which the distortion is corrected without reducing the number of pixels can be generated.

Fourth Embodiment

Hereinafter, the fourth embodiment of the present disclosure will be described with reference to the drawings.

The image light generation module described in the first through third embodiments is used in image display devices described below.

Figure 8:
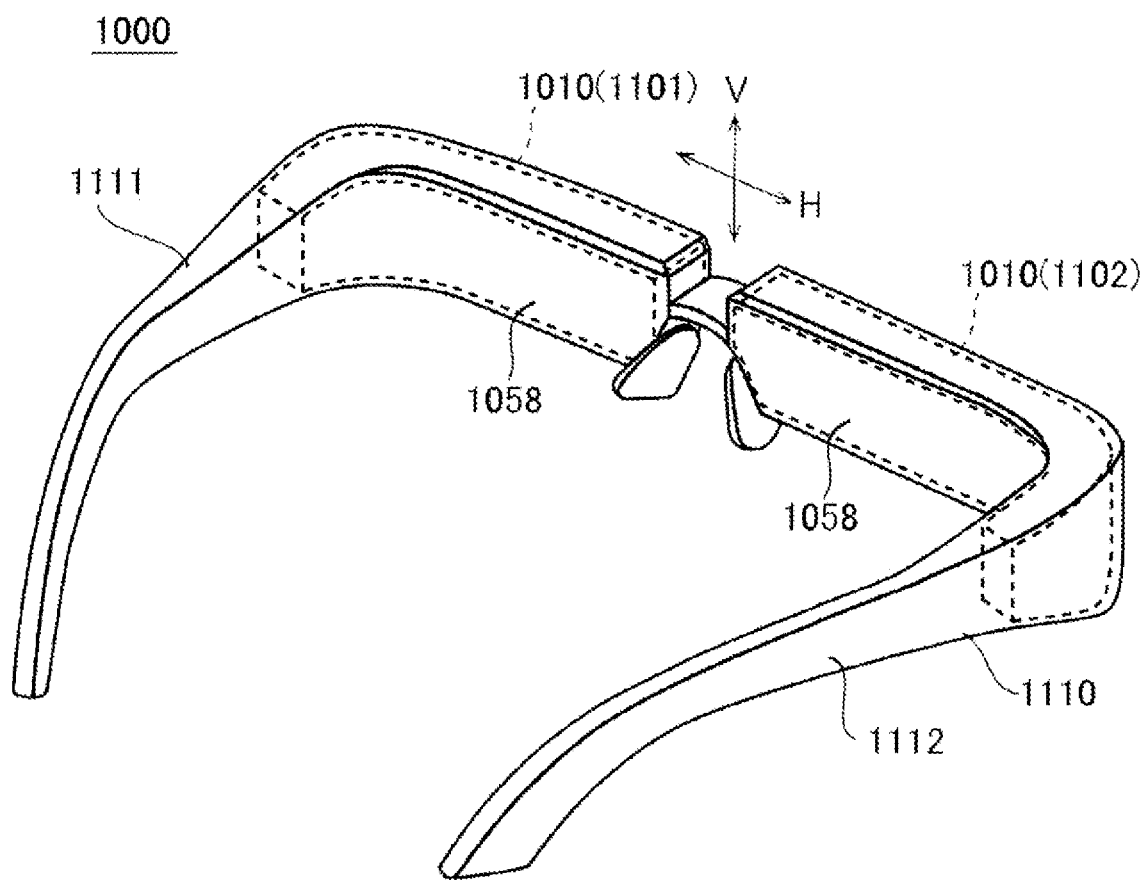
FIG. 8 is an explanatory view illustrating a head-mounted display apparatus of an embodiment.
Figure 9:
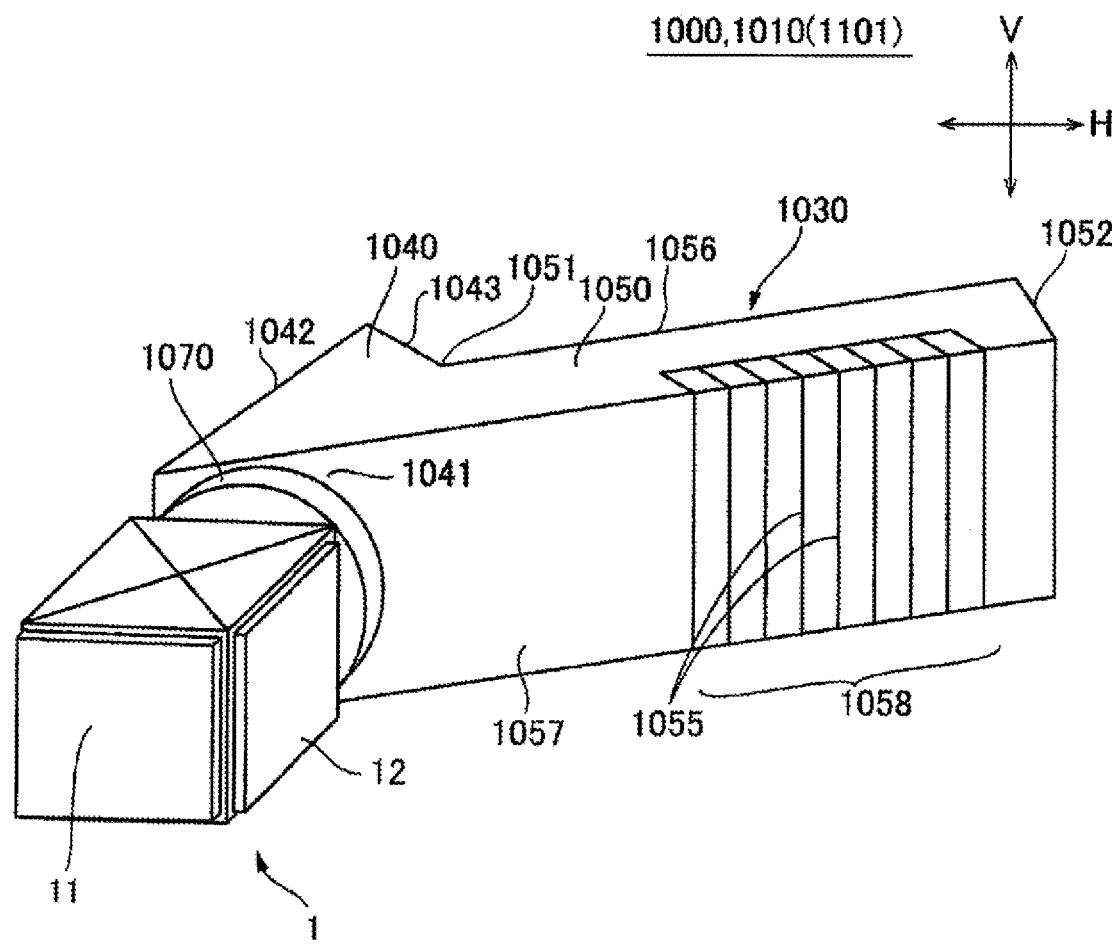
FIG. 9 is a perspective view schematically illustrating a configuration of an optical system of a virtual image display unit.
Figure 10:
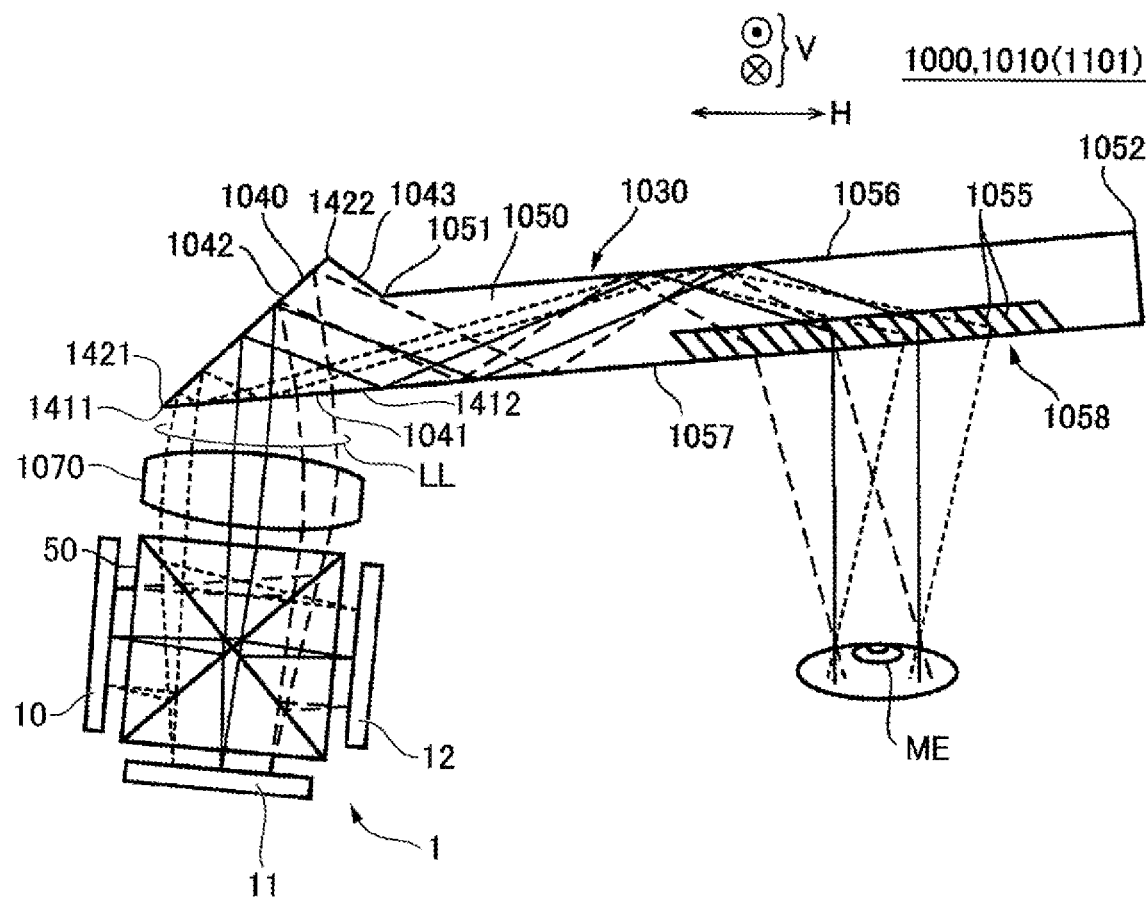
FIG. 10 is an explanatory diagram illustrating optical paths of an optical system.

FIG. 8 is an explanatory diagram illustrating a head-mounted display apparatus 1000 of the fourth embodiment. FIG. 9 is a perspective view schematically illustrating a configuration of an optical system of a virtual image display unit 1010 illustrated in FIG. 8. FIG. 10 is an explanatory diagram illustrating optical paths of the optical system illustrated in FIG. 9.

As illustrated in FIG. 8, the head-mounted display apparatus (image display device) 1000 of the fourth embodiment is configured as a see-through type eyeglass display, and includes a frame 1110 provided with left and right temples 1111 and 1112. In the head-mounted display apparatus 1000, the virtual image display unit 1010 is supported by the frame 1110, which allows a user to recognize, as a virtual image, an image emitted from the virtual image display unit 1010. In the fourth embodiment, the head-mounted display apparatus 1000 includes a left-eye display unit 1101 and a right-eye display unit 1102 as the virtual image display unit 1010. The left-eye display unit 1101 and the right-eye display unit 1102, which have an identical configuration, are arranged left-right symmetrically.

Below, descriptions will be given focusing on the left-eye display unit 1101, and descriptions of the right-eye display unit 1102 will be omitted.

As illustrated in FIGS. 9 and 10, in the head-mounted display apparatus 1000, the left-eye display unit 1101 includes an image light generation module 100, and a light-guiding system (light-guiding optical system) 1030 configured to guide the combined image light LL emitted from the image light generation module 100 to an emission portion 1058. Between the image light generation module 100 and the light-guiding system 1030, a projection lens system 1070 is disposed, where the combined image light LL emitted from the image light generation module 100 passes through the projection lens system 1070 to be incident on the light-guiding system 1030. The projection lens system 1070 is configured by a single collimate lens that has a positive power. The image light generation module 100 of the fourth embodiment employs the configuration of the first embodiment in order to reduce chromatic aberrations ascribed to the projection lens system 1070, for example.

Specifically, the image light generation module 100 includes the combining prism 50, and three pieces of the display elements 10, 20, and 30 that are provided facing three faces among the four faces of the combining prism 50. The image light generation module 100 of the fourth embodiment is configured to emit the combined image light LL combined from the red image light LR, the green image light LG, and the blue image light LB through the emission face 54 of the combining prism 50.

The light-guiding system 1030 includes an incidence portion 1040 having light-transmissivity on which the combined image light LL is incident, and a light-guiding portion 1050 having light-transmissivity, which is coupled, at a side of a one end 1051, to the incidence portion 1040. In the fourth embodiment, the incidence portion 1040 and the light-guiding portion 1050 are constituted of integrated light transmissive members.

The incidence portion 1040 includes an incidence face 1041 on which the combined image light LL emitted from the image light generation module 100 is incident, and a reflection face 1042 that reflects the combined image light LL being incident through the incidence face 1041, the combined image light LL being reflected between the reflection face 1042 and the incidence face 1041. The incidence face 1041 includes a flat face, an aspherical face, a free curved face, or the like, and faces the image light generation module 100 with the projection lens system 1070 interposed in between. The projection lens system 1070 is disposed obliquely such that a spacing between the projection lens system 1070 and an end portion 1412 of the incidence face 1041 is larger than a spacing between the projection lens system 1070 and an end portion 1411 of the incidence face 1041.

The incidence face 1041, on which no reflection film is formed, fully reflects light being incident at an incident angle equal to or greater than a critical angle. Thus, the incidence face 1041 has light permeability and light reflectivity. The reflection face 1042 includes a face that faces the incidence face 1041, and is disposed obliquely such that an end portion 1422 is located further away from the incidence face 1041 than an end portion 1421 of the incidence face 1041. Thus, the incidence portion 1040 has a substantially triangular shape. The reflection face 1042 includes a flat face, an aspherical face, a free curved face, or the like. The reflection face 1042 has a configuration in which a reflective metal layer composed mainly of aluminum, silver, magnesium, chrome or the like is formed.

The light-guiding portion 1050 includes a first face 1056 (first reflection face) that extends from the one end 1051 toward a side of the other end 1052, a second face 1057 (second reflection face) that faces, in a parallel manner, the first face 1056 and extends from a side of the one end 1051 toward the side of the other end 1052, and the emission portion 1058 provided at a portion of the second face 1057 which is spaced apart from the incidence portion 1040. The first face 1056 and the reflection face 1042 of the incidence portion 1040 are joined together via a slant face 1043. The first face 1056 and the second face 1057 have a thickness thinner than the incidence portion 1040. The first face 1056 and the second face 1057 fully reflect light being incident at an incident angle equal to or greater than the critical angle, based on a refractive index difference between the light-guiding portion 1050 and an outside world (air). This is the reason why no reflection film is formed on the first face 1056 and the second face 1057.

The emission portion 1058 is configured at a part, on a side of the second face 1057, in a thickness direction of the light-guiding portion 1050. At the emission portion 1058, a plurality of partial reflection faces 1055 that are angled obliquely with respect to the normal line with respect to the second face 1057 are arranged in a manner parallel to one another. The emission portion 1058 is a portion of the second face 1057 which overlaps with the plurality of partial reflection faces 1055, and is a region that has a predetermined width in a direction in which the light-guiding portion 1050 extends. The plurality of partial reflection faces 1055 are each constituted from a dielectric multilayer film. In addition, at least one of the plurality of partial reflection faces 1055 may be a hybrid layer formed of a dielectric multilayer film and a reflective metal layer (thin film) composed mainly of aluminum, silver, magnesium, chrome, or the like. When the partial reflection face 1055 includes a metal layer, advantageous effects are achieved which enhances the reflectance of the partial reflection face 1055, or optimizes an incident angle dependence or a polarization dependence of transmittance and reflectance of the partial reflection face 1055. Note that the emission portion 1058 may have an aspect in which an optical element such as a diffraction grating or a hologram is provided.

In the head-mounted display apparatus 1000 configured as described above, the combined image light LL containing parallel light being incident through the incidence portion 1040 is refracted at the incidence face 1041 and advances toward the reflection face 1042. The combined image light LL is subsequently reflected by the reflection face 1042, and advances toward the incidence face 1041 again. At this time, the combined image light LL is incident on the incidence face 1041 at the incident angle equal to or greater than the critical angle, the combined image light LL is reflected by the incidence face 1041 toward the light-guiding portion 1050 and advances toward the light-guiding portion 1050. Note that the incidence portion 1040 is configured such that the combined image light LL that is the parallel light is incident on the incidence face 1041, and a configuration may also be employed in which the incidence face 1041 and the reflection face 1042 include a free curved face or the like, where the combined image light L that is non-parallel light is incident on the incidence face 1041 and is then converted into parallel light while being reflected between the reflection face 1042 and the incidence face 1041.

In the light-guiding portion 1050, the combined image light LL is reflected and advances between the first face 1056 and the second face 1057. Then, the combined image light LL being incident on the partial reflection face 1055 is partially reflected by the partial reflection face 1055 to be emitted from the emission portion 1058 toward an eye E of an observer. Further, the rest of the combined image light LL being incident on the partial reflection face 1055 passes through the partial reflection face 1055 to be incident on the next, adjacent, partial reflection face 1055. Accordingly, the combined image light LL that is reflected by each of the plurality of partial reflection faces 1055 is emitted from the emission portion 1058 toward the eye E of the observer. This enables the observer to recognize a virtual image.

At this time, the light being incident on the light-guiding portion 1050 from the outside world enters the light-guiding portion 1050 and then passes through the partial reflection faces 1055 to reach the eye E of the observer. This allows the observer to visually recognize a color image emitted from the image light generation module 1 and also visually recognize a scenery of the outside world and the like in a see-through manner.

The head-mounted display apparatus 1000 of the fourth embodiment, which includes the image light generation module 100 employing a structure of the image light generation module 1 of the first embodiment, is configured to display a high-quality image in which a blurring due to the on-axis chromatic aberration of the projection lens system 1070 is suppressed.

In the head-mounted display apparatus 1000 of the fourth embodiment, an example is given of a case where the light-guiding portion 1050 is used as the light-guiding system 1030, and the present disclosure may also be applied to a head-mounted display apparatus using a projection optical system including a diffraction element or a half mirror in place of the light-guiding portion 1050.

Also, in the fourth embodiment, an example is given of a case where the image light generation module 100 is configured to reduce the chromatic aberrations ascribed to the projection lens system 1070, and the image light generation module 100 may be combined with an optical component configured to correct the chromatic aberrations on the optical path through which the combined image light LL is guided to the eye ME of the observer M. When combining with the optical component having such a chromatic aberration correction function, a relationship different from the relationship of G1>G2>G3 described in the first embodiment may be established as the magnitude relationship among the first gap G1, the second gap G2, and the third gap G3.

Note that the technical scope of the present disclosure is not limited to the above-described embodiments, and various modifications may be made to the above-described embodiments without departing from the spirit and gist of the present disclosure.

For example, it may be possible to appropriately modify the material, number, arrangement, shape, or other specific configuration of each of the constituent elements of the image light generation module and the image display device that are exemplified in the above-described embodiments.

Also, in the first embodiment, an example is given of a case where the first gap G1, the second gap G2, and the third gap G3 gaps are defined by providing the first adhesive member 16, the second adhesive member 17, and the third adhesive member 18 between the combining prism 50 and the display elements 10, 11, and 12, and the method for defining the gaps G1, G2, and G3 is not limited to this example.

For example, the first gap G1, the second gap G2, and the third gap G3 may also be constituted by gaps, that are, air layers, which are provided between the combining prism 50 and the display elements 10, 11, and 12.

The first gap G1, the second gap G2, and the third gap G3 gaps may also be constituted by glass plates or plastic plates constituting protective members that are clamped between the combining prism 50 and the display elements 10, 11, and 12, and protect the light emission faces of the display elements 10, 11, and 12.

In addition, the first to third gap defining members that define the first gap G1, the second gap G2, and the third gap G3 may also be constituted by mutually integrated members, for example.

The first gap G1, the second gap G2, and the third gap G3 may also be spacer members clamped between the combining prism 50 and the display elements 10, 11, and 12.

Also, in the above-described embodiments, an example is given of a case, as the head-mounted display apparatus 1000, where the combined image light LL emitted from the image light generation module 100 is guided by the light-guiding system 1030, and the present disclosure may also be applied to a head-mounted display apparatus using a scheme in which the combined image light LL is guided to the eye ME of the observer M by a projection optical system using a volume hologram.

In addition, in the above-described embodiments, an example is given of a case where the display elements 10, 11, and 12 or the display elements 110, 111, and 112 are constituted by an organic EL panel, and the display elements may also be constituted by, but not limited to, a self-luminous panel such as an inorganic EL panel or a micro LED panel, or a liquid crystal panel provided with a backlight.

Further, examples of the image display device provided with the image light generation module described in the above-described embodiments include an electronic view finder (EVF) and the like used for image-capturing apparatuses such as a video camera and a still camera.

What is claimed is:

1. An image light generation module, comprising:
a first display element configured to emit first image light, the first display element having a first pixel pitch;
a second display element configured to emit second image light of color light different from color light of the first image light, the second display element having a second pixel pitch;
a third display element configured to emit third image light of color light different from the color light of the first image light and the second image light, the third display element having a third pixel pitch;
a combining prism configured to emit combined image light combined from the first image light, the second image light, and the third image light;
a first gap defining member configured to define a first gap between the first display element and the combining prism;
a second gap defining member configured to define a second gap between the second display element and the combining prism; and
a third gap defining member configured to define a third gap between the third display element and the combining prism, wherein
at least one of the first gap, the second gap, or the third gap is different in size from another of the first gap, the second gap and the third gap, and
at least one of the first pixel pitch, the second pixel pitch, or the third pixel pitch is different in size from another of the first pixel pitch, the second pixel pitch and the third pixel pitch.

2. The image light generation module according to claim 1, wherein
at least one of the first gap defining member, the second gap defining member, or the third gap defining member is formed of a light transmissive member.

3. The image light generation module according to claim 1, wherein
at least one of the first gap defining member, the second gap defining member, or the third gap defining member defines a thickness of an air layer between the combining prism and a display element corresponding to the at least one gap defining member.

4. The image light generation module according to claim 1, wherein
when the first image light is light in a red wavelength range, the second image light is light in a green wavelength range, and the third image light is light in a blue wavelength range,
the first gap, the second gap, and the third gap are reduced in size in this order.

5. An image light generation module, comprising:
a first display element including a first effective display region configured to emit first image light, the first effective display region having a first pixel pitch;
a second display element including a second effective display region configured to emit second image light of color light different from color light of the first image light, the second effective display region having a second pixel pitch;
a third display element including a third effective display region configured to emit a third image light of color light different from the color light of the first image light and the second image light, the third effective display region having a third pixel pitch; and
a combining prism configured to hold the first display element, the second display element, and the third display element, and to emit combined image light combined from the first image light, the second image light, and the third image light, wherein
at least one of the first effective display region, the second effective display region, or the third effective display region is different in size from another of the first effective display region, the second effective display region and the third effective display region, and
at least one of the first pixel pitch, the second pixel pitch, or the third pixel pitch is different in size from another of the first pixel pitch, the second pixel pitch and the third pixel pitch.

6. The image light generation module according to claim 5, wherein
when the first image light is light in a red wavelength range, the second image light is light in a green wavelength range, and the third image light is light in a blue wavelength range,
the first effective display region, the second effective display region, and the third effective display region are reduced in size in this order.

7. The image light generation module according to claim 6, wherein
the first effective display region, the second effective display region, and the third effective display region each include a plurality of pixels, and
a ratio of pixel pitch sizes of the first effective display region, the second effective display region, and the third effective display region varies in a ratio according to a ratio of sizes of the first effective display region, the second effective display region, and the third effective display region.

8. An image display device, comprising:
the image light generation module according to claim 1; and
a light-guiding optical system configured to guide the combined image light emitted from the image light generation module.

* * * * *